(12) United States Patent
Egan et al.

(10) Patent No.: US 9,218,394 B2
(45) Date of Patent: Dec. 22, 2015

(54) READING ROWS FROM MEMORY PRIOR TO READING ROWS FROM SECONDARY STORAGE

(75) Inventors: Randy L. Egan, Rochester, MN (US);
Rafal P. Konik, Oronoco, MN (US);
Roger A. Mittelstadt, Byron, MN (US);
Mark W. Theuer, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1054 days.

(21) Appl. No.: 12/907,157

(22) Filed: Oct. 19, 2010

(65) Prior Publication Data

US 2012/0096054 A1   Apr. 19, 2012

(51) Int. Cl.
*G06F 17/30* (2006.01)

(52) U.S. Cl.
CPC .... *G06F 17/30501* (2013.01); *G06F 17/30902* (2013.01)

(58) Field of Classification Search
CPC .................................................. G06F 17/30902
USPC ........................................... 707/812; 711/150
See application file for complete search history.

(56) References Cited

U.S. PATENT DOCUMENTS 7,308,437 B2 * 12/2007 Day et al. ........................... 707/2
7,512,747 B2 *  3/2009 Bhattacharjee et al. ...... 711/150

FOREIGN PATENT DOCUMENTS

CN          1894675 A        1/2007

* cited by examiner

*Primary Examiner* — Apu Mofiz
*Assistant Examiner* — Chelcie Daye
(74) *Attorney, Agent, or Firm* — Matthew C. Zehrer; Owen J. Gamon

(57) ABSTRACT

In an embodiment, a first plurality of rows of a first table are read from memory in an order of page addresses of pages in the memory that comprise the first plurality of rows. First selected rows from the first plurality of rows that meet a query predicate are stored into a result set. After the reading the first plurality of rows in the order of the page addresses, a second plurality of rows of the first table are read from secondary storage, in an order of row identifiers of the second plurality of the rows in the first table. Second selected rows from the second plurality of rows that meet the query predicate are stored into the result set.

15 Claims, 8 Drawing Sheets

READING ROWS FROM MEMORY PRIOR TO READING ROWS FROM SECONDARY STORAGE

FIELD

An embodiment of the invention generally relates to computer systems and more particularly to database management systems that process queries with execution plans by reading rows from a database table in memory prior to reading rows from secondary storage.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database (RDB), which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader on which page a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as an execution plan. The DBMS often saves the execution plan and reuses it when the user or requesting program repeats the query, which is a common occurrence, instead of undergoing the time-consuming process of recreating the execution plan.

Many different execution plans may be created for any one query, each of which would return the same data set that satisfies the query, yet the different execution plans may provide widely different performance. Thus, the execution plan selected by the DBMS needs to provide the required data at a reasonable cost in terms of time and hardware resources. Hence, the DBMS often creates multiple prospective execution plans and then chooses the best, fastest, or least expensive one, to execute. One factor that contributes to the cost of a particular execution plan is the number of rows that the execution plan, when executed, returns from the database tables. One important aspect that influences the number of rows processed is the join order of the tables. In response to a query that requests data from multiple tables, the DBMS joins rows from these multiple tables (the rows are often concatenated horizontally in a result set), in order to find and retrieve the data from all the tables. Thus, a join operation is a relationship between two tables accessed by a query (a join query), and a join operation is performed to connect (or join) data from two or more tables, wherein the DBMS joins rows with particular attributes together to form a new row. The join order is typically specified by the execution plan and is the order in which the DBMS performs join operations when the DBMS executes the query via the execution plan to retrieve and join rows of data from the database tables into the result set.

Join operations are typically implemented using a nested loop algorithm, where the resultant new rows from the first two tables in the join order are joined to the resultant rows from the third table, and those results are joined to the fourth table, etc. Eventually all of the needed join operations are complete, and the resultant new rows are the result set that satisfies the query. Because a single join is limited to accessing two tables, multi-table joins are performed in sequence according to a particular order. Many different join queries may be implemented by joining the tables in any of several possible join orders. For example, a query that involves joining tables A, B, and C can often be performed as a join of tables A and B followed by a join of the results of table A joined to table B and table C. Alternatively, in many instances, the same query can be performed as a join of tables A and C followed by the join of the results of table A joined to table C and table B. The DBMS attempts to select a join order for an execution plan that will eliminate the greatest number of rows from the potential result set early in the join processing, which saves the costs associated with repeatedly accessing tables later in the join operation.

Another factor that contributes to the cost of a particular execution plan is whether the rows read from the table are stored in memory or in a secondary storage device. The tables typically permanently reside on secondary storage devices, such as disk drives and are read into a smaller and faster memory, as needed. An execution plan may specify a table scan, which when executed may retrieve all pages from the secondary storage units to memory for processing. The secondary storage Input/Output operation time is often a major component of the processing time for a table scan.

SUMMARY

A method, computer-readable storage medium, and computer system are provided. In an embodiment, a first plurality of rows of a first table are read from memory in an order of page addresses of pages in the memory that comprise the first plurality of rows. First selected rows from the first plurality of rows that meet a query predicate are stored into a result set. After the reading the first plurality of rows in the order of the page addresses, a second plurality of rows of the first table are read from secondary storage, in an order of row identifiers of the second plurality of the rows in the first table. Second selected rows from the second plurality of rows that meet the query predicate are stored into the result set.

It is to be noted, however, that the appended drawings illustrate only example embodiments of the invention, and are therefore not considered a limitation of the scope of other embodiments of the invention.

DETAILED DESCRIPTION

Figure 1:
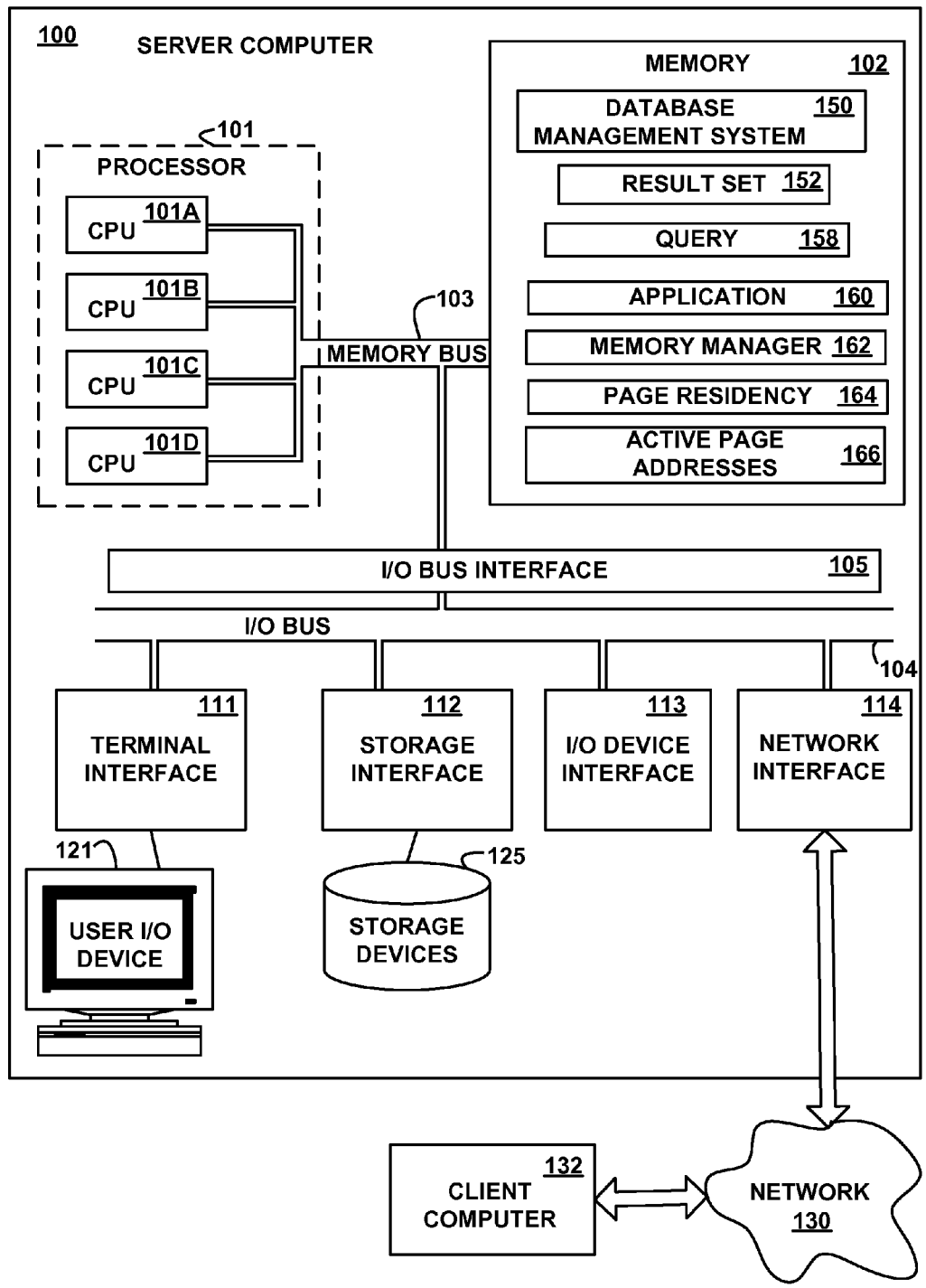
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The term "server" is used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a database management system (DBMS) 150, a result set 152, a query 158, an application 160, a memory manager 162, page residency 164, and active page addresses 166. Although the DBMS 150, the result set 152, the query 158, the application 160, the memory manager 162, the page residency 164, and the active page addresses 166 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the DBMS 150, the result set 152, the query 158, the application 160, the memory manager 162, the page residency 164, and the active page addresses 166 are illustrated as being contained within the main memory 102, these elements are not necessarily all completely contained in the same storage device at the same time. Further, although the DBMS 150, the result set 152, the query 158, the application 160, the memory manager 162, the page residency 164, and the active page addresses 166 are illustrated as being separate entities, in other embodiments some of them, portions of some of them, or all of them may be packaged together.

In an embodiment, the DBMS 150, the application 160, and/or the memory manager 162 comprise instructions or statements that execute on the processor 101 or instructions or statements that are interpreted by instructions or statements that execute on the processor 101, to carry out the functions as further described below with reference to FIGS. 2, 3, 4, 5, 6, 7, 8, and 9. In another embodiment, the DBMS 150, the application 160, and/or the memory manager 162 are implemented in hardware via semiconductor devices, chips, logical gates, circuits, circuit cards, and/or other physical hardware devices in lieu of, or in addition to, a processor-based system. In an embodiment, the DBMS 150, the application 160, and/or the memory manager 162 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the secondary storage devices 125, as needed. The secondary storage devices 125 have a slower access time than does the memory 102, meaning that the time needed to read and/or write data from/to the memory 102 is less than the time needed to read and/or write data from/to for the secondary storage devices 125.

The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130. Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

In an embodiment, the client computer 132 may comprise some or all of the elements of the server computer 100.

FIG. 1 is intended to depict the representative major components of the computer system 100 and the network 130. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the secondary storage devices 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, radio frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments the invention.

Figure 2:
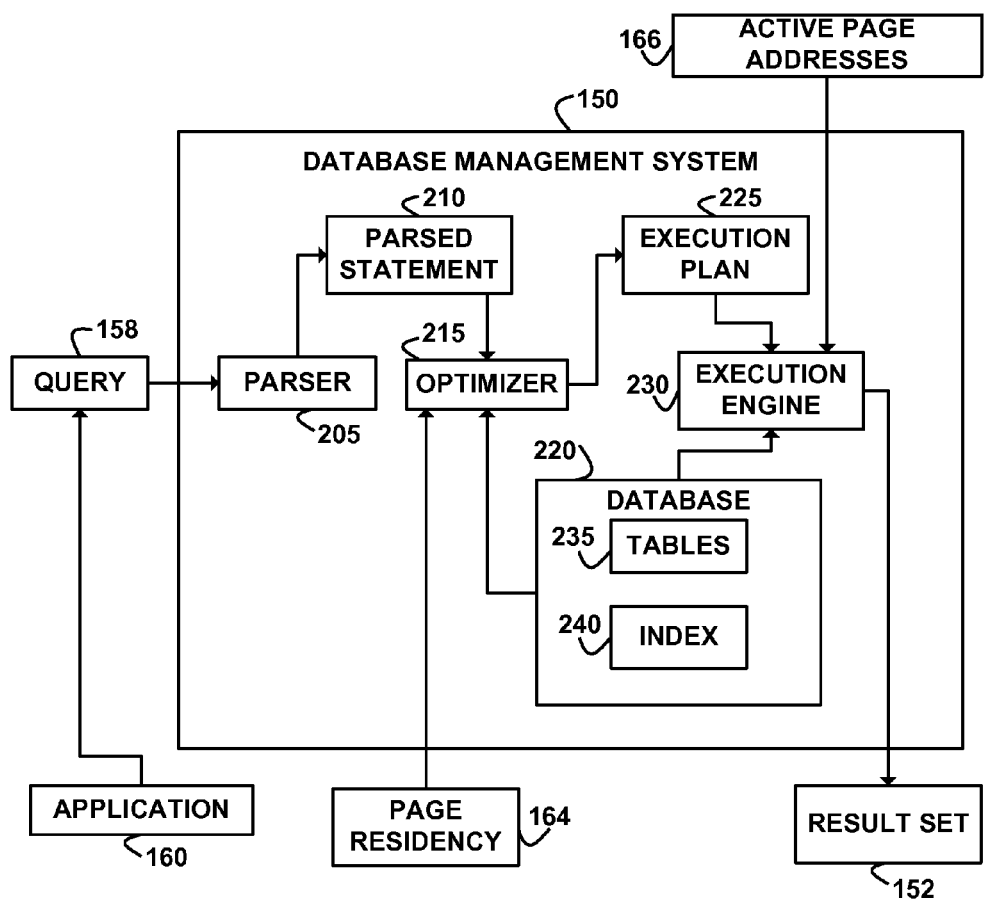
FIG. 2 depicts a block diagram of an example DBMS, according to an embodiment of the invention.

FIG. 2 depicts a block diagram of an example DBMS 150, according to an embodiment of the invention. The DBMS 150 comprises a parser 205, a parsed statement 210, a query optimizer 215, a database 220, an execution plan 225, and an execution engine 230. The database 220 comprises tables 235 and one or more indexes 240. The tables 235 organize data in rows, which represent individual entries, tuples, or records and columns, fields, or attributes, which define what is stored in each row, entry, tuple, or record. Each table 235 has a unique name within the database 220 and each column has a unique name within the particular table 235. The index 240 is a data structure that informs the DBMS 150 of the location of a certain row in a table 235 given an indexed column value.

The parser 205 in the DBMS 150 receives the query 158 from the application 160. The query 158 requests that the DBMS 150 search for or find a row or combination of rows of data and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158. The parser 205 generates a parsed statement 210 from the query 158, which the parser 205 sends to the query optimizer 215. The query optimizer 215 performs query optimization on the parsed statement 210 using the page residency 164. As a result of query optimization, the optimizer generates the execution plan 225, using data such as platform capabilities, query content information, etc., that is stored in the database 220. Once generated, the optimizer 215 sends the execution plan 225 to the execution engine 230, which executes the execution plan 225 that implements the database query 158 using the active page addresses 166 and the index 240, in order to find and retrieve the data in the database tables 235 in the database 220 that satisfies the criteria of the query 158. The execution engine 230 stores the resultant data that satisfies the criteria specified by the database query 158 into the result set 152, which is returned to the application 160 as a response to the query 158. In an embodiment, the DBMS 150 stores various thresholds into the execution plan 225. The DBMS 150 may receive the various thresholds from the application 160, from a user, or from a database administrator, or the thresholds may be set by a designer of the query optimizer 215.

Figure 3:
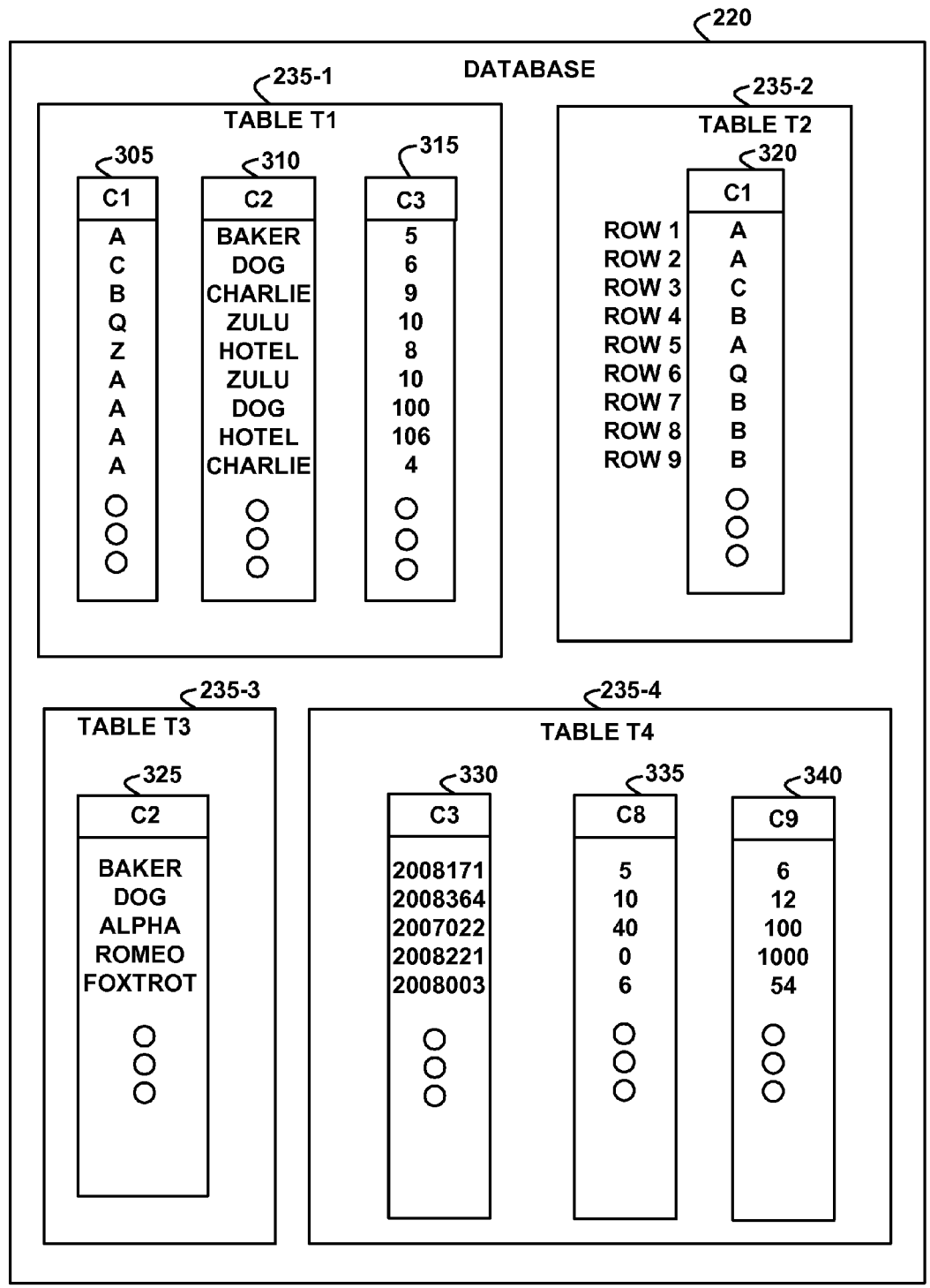
FIG. 3 depicts a block diagram of an example data structure for a database, according to an embodiment of the invention.

FIG. 3 depicts a block diagram of an example data structure for a database 220, according to an embodiment of the invention. The example database 220 comprises example tables t1 235-1, t2 235-2, t3 235-3, and t4 235-4. The table 235-1 comprises columns c1 305, c2 310, and c3 315. The table t2 235-2 comprises the column c1 320. The table 235-3 comprises the column c2 325. The table 235-4 comprises the columns c3 330, c8 335, and c9 340. Columns 305 and 320 share the same column name or identifier "c1," columns 310 and 325 share the same column name or identifier "c2," and columns 315 and 330 share the same column name or identifier "c3." The columns are uniquely identified herein using the notation t1.c1 (referring to column 305 in table 235-1), t1.c2 (referring to column 310 in table 235-1), t1.c3 (referring to column 315 in table 235-1), t2.c1 (referring to column 320 in table 235-2), t3.c2 (referring to column 325 in table 235-3), t4.c3 (referring to column 330 in table 235-4), t4.c8 (referring to column 335 in table 235-4), and t4.c9 (referring to column 340 in table 235-4).

Thus, each table in the example database 220 is divided into rows and columns. For example, the table T1 235-1 comprises a first row of (A, BAKER, 5) with "A" stored in the column c1 305, "BAKER" stored in the column c2 310, and "5" stored in the column c3 315; a second row of (C, DOG, 6) with "C" stored in the column c1 305, "DOG" stored in the column c2 310 and "6" stored in the column c3 315; a third row of (B, CHARLIE, 9) with "B" stored in the column c1 305, "CHARLIE" stored in the column c2 310 and "9" stored in the column c3 315; a fourth row of (Q, ZULU, 10) with "Q" stored in the column c1 305, "ZULU" stored in the column c2 310 and "10" stored in the column c3 315; a fifth row of (Z, HOTEL, 8) with "Z" stored in the column c1 305, "HOTEL" stored in the column c2 310 and "8" stored in the column c3 315; a sixth row of (A, ZULU, 10) with "A" stored in the column c1 305, "ZULU" stored in the column c2 310, and "10" stored in the column c3 315; a seventh row of (A, DOG, 100) with "A" stored in the column c1 305, "DOG" stored in the column c2 310, and "100" stored in the column c3 315; an eighth row of (A, HOTEL, 106) with "A" stored in the column c1 305, "HOTEL" stored in the column c2 310, and "106" stored in the column c3 315; and a ninth row of (A, CHARLIE, 4) with "A" stored in the column c1 305, "CHARLIE" stored in the column c2 310, and "4" stored in the column c3 315, etc.

As another example, the table T2 235-2 comprises a first row of (A) stored in the column c1 320, a second row of (A) stored in the column c1 320, a third row of (C) stored in the column c1 320, etc. The Table T2 235-2 illustrated row identifiers ("row 1," "row 2," etc.), which identify the respective rows in the table. In another embodiment, the row identifiers are addresses (either absolute, relative, physical, logical, or virtual addresses) that identify the storage location of the respective row. In an embodiment, the row identifiers are pointed to by addresses or identifiers in the index 240. Although only the table 235-2 explicitly illustrates the row identifiers, they exist for all of the tables and rows.

Figure 4:
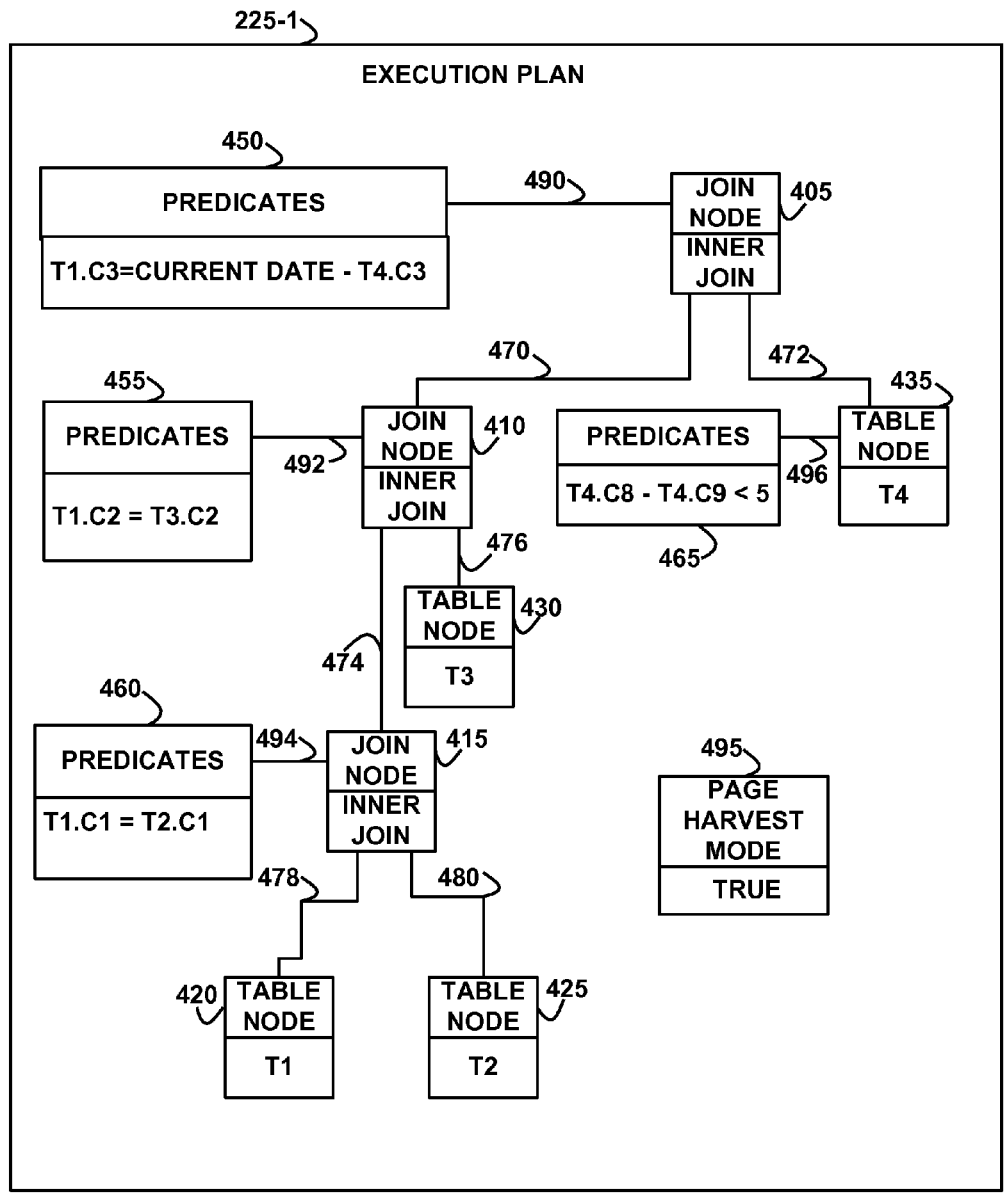
FIG. 4 depicts a block diagram of an example execution plan for a query implemented with a join order, according to an embodiment of the invention.

FIG. 4 depicts a block diagram of an example execution plan 225-1 for a query implemented with a join order, according to an embodiment of the invention. In an embodiment, the execution plan 225-1 comprises a page harvest mode indicator 495 and a tree graph, which represents the join operations that implement the query 158 when executed. The tree graph of the execution plan 225-1 comprises join nodes 405, 410, and 415; table nodes 420, 425, 430, and 435; query predicates 450, 455, 460, and 465; links 470, 472, 474, 476, 478, and 480; and links 490, 492, 494, and 496. The table node 420 represents the table 235-1. The table node 425 represents the table 235-2. The table node 430 represents the table 235-3. The table node 435 represents the table 235-4.

A tree graph takes its name from an analogy to trees in nature, which have a hierarchical organization of branches and leaves. For example, a leaf is connected to a small branch, which further is connected to a large branch, and all branches of the tree have a common starting point at the root. Analogously, the nodes 405, 410, 415, 420, 425, 430, and 435 in the tree graph of the execution plan 225-1 have a hierarchical organization, in that the join node 405 has a relationship with another join node 410, which itself may have a further relationship with another node, and so on. Thus, the nodes may be divided into groups and sub-groups, which ultimately all have a relationship to the root or head node 405. To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets T1, . . . Tm, and each of these sets is in turn a tree. The trees T1, . . . , Tm are called the subtrees of the root. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

Thus, using the example tree of the execution plan 225-1 of FIG. 4, the root node is the node 405. The root node 405 is the parent of its child nodes 410 and 435. The node 410 is the parent of its child nodes 415 and 430. The node 415 is the parent of its child nodes 420 and 425. The nodes 420, 425, 430 and 435 have no child nodes, so they are leaf nodes. The ancestors of the node 420 are the nodes 415, 410, and 405. The ancestors of the node 415 are the nodes 410 and 405. The ancestor of the node 410 is the node 405. The ancestors of the node 425 are the nodes 415, 410, and 405. The ancestors of the node 430 are the nodes 410 and 405. The ancestor of the node 435 is the node 405. The root node 405 has no ancestors. The links 470, 472, 474, 476, 478, and 480 each connect, point to, or contain the address of two adjacent nodes, and allow the DBMS 150 to find the child nodes of a parent node and find the parent node of a child node. The links 490, 492, 494, and 496 each connect to, point to, or contain the address of a query predicate, and allow the DBMS 150 to find the query predicate of a node. In this example, the example query 158 that the example execution plan 225-1 implements may be expressed as: "select * from t1, t2, t3, t4 where t1.c1=t2.c1 and t1.c2=t3.c2 and t1.c3=current date−t4.c3 and t4.c8=t4.c9<5." The tree graph of the execution plan 225-1 illustrates one example implementation, one example join order, and one example page harvest mode for the example query 158, but other implementations, join orders, and page harvest modes for this query 158 may also exist, including embodiments that do not use a tree and that do not use a graph.

Each of the query predicates 450, 455, 460, and 465 is connected to one of the nodes. The query predicates each represent a portion of the query 158 and comprise respective conditional criteria expressions, which the DBMS 150 evaluates to either true or false by substituting data from the rows retrieved from the table nodes (that are connected to the query predicate or that are the child node of a join node that is connected to the query predicate) into variables in the expression that match column identifiers in the rows. In various embodiments, the query predicates specify any multiple, and/or combination of: data; columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The DBMS 150 reads a join node, and in response, reads a row from a child table node or nodes of the join node, substitutes the data from the columns in the read row(s) that has the same table and column identifier as specified in the query predicate that is connected to the join node, and evaluates the resultant predicate expression to either true or false. If the predicate expression evaluates to true, then the read row satisfies or meets the connected query predicate, so the DBMS 150 saves the read row to the result set 152. If the predicate expression evaluates to false, then read row does not satisfy or meet the query predicate, so the DBMS 150 excludes the read row from the result set 152.

The join nodes represents join operations of tables whose rows satisfy the connected query predicate. In various embodiments, the join operations may comprise inner joins, equi-joins, natural joins, outer joins, left outer joins, right outer joins, full outer joins, exception joins, and self joins. An inner join between two tables results in only the rows matching certain selection criteria to be returned in the result set 152. An outer join, such as a left join of table A and table B (according to a set of selection criteria) returns all matching rows as well as those rows in table A not having a match in table B. The matching rows have the values of all their fields populated by the data from table A and table B. But, the non-matching rows from table A will have a null value, or other default character, in the fields from table B. Another outer join, such as a right join of table A and table B, also returns all the matching rows but, unlike the left join, returns those rows in table B not having a matching row in table A. An exception join of table A and table B returns a result set 152 of those rows in table A for which no matching row in table B exists.

The join node 415 represents a join operation of the tables represented by the child table nodes 420 and 425 using the connected query predicates 460. The join node 410 represents a join operation of the tables represented by the child table node 430 and an intermediate result set created by the child join node 415 using the query predicates 455. The join node 405 represents a join operation of the table represented by the child table node 435 and an intermediate result set created by the child join node 410, using the query predicates 450 and 465. In an embodiment, the join nodes represent logic in the DBMS 150 that performs the join operation that finds rows in the child table nodes, whose column values satisfy the criteria of the query predicates when the logic of the join node substitutes the column values of the found rows into the placeholders or variables in the query predicates that have the same name or identifier as the column identifiers in the rows.

In operation, the DBMS 150 executes the query 158 using the execution plan 225-1 as follows. The DBMS 150 begins traversing the nodes at the root or head node and encounters (reads) the head node 405 (the join node 405). Since the join node 405 is not a table node, the DBMS 150 travels to left child join node 410 of the join node 405 via the link 470, in search of a first row. The DBMS 150 encounters (reads) the join node 410. Since the join node 410 is not a table node, the DBMS 150 again travels to the left child node 415 of the node 410 via the link 474, in search of a first row. The DBMS 150 encounters the join node 415. Since the join node 415 is not a table node, the DBMS 150 again travels to the left child node 420 of the node 415 via the link 478, in search of a first row. The DBMS 150 encounters the table node 420 and retrieves the first row from the table represented by the table node 420, using a scan operation.

In a scan operation, if the page harvest mode indicator 495 indicates false, then the DBMS 150 reads rows from the beginning to the end of a table in row identifier order, without using the index 240 to randomly access the table and without regard to whether the rows are stored in the memory 102 or the secondary storage devices 125. While reading rows in row identifier order, some of the rows may be read from the memory 102 while other of the rows may be read from the secondary storage devices 125, and the reads of the rows from the memory 102 may be interleaved with the reads of rows from the secondary storage devices 125. In an embodiment, each table has its own page harvest mode indicator 495, which may have values that are different from each other. Thus, one table may have page harvest mode set to true while another table has page harvest mode set to false.

In a scan operation, if the page harvest mode indicator 495 indicates true, then the DBMS 150 reads rows from a table in page address order, without using the index 240 to randomly access the table. While reading rows from a table in page address order, the DBMS 150 reads the rows in the order of the addresses of the pages in the memory 102, in which the rows are stored, for those rows that are stored in the memory 102. In page address order, the DBMS 150 reads all of the rows from the table that are stored in the memory 102 before reading any rows from the table that are stored in the secondary storage devices 125, so the reads of the rows from the memory 102 and the secondary storage devices 125 are not interleaved.

The DBMS 150 then travels to the right child node 425 of the node 415, encounters (reads) the table node 425 and searches for a second row in the table identified by the table node 425 that satisfies the selection criteria of the connected query predicate 460 of the join node 415. If the DBMS 150 does not find a second row in the table identified by the table node 425 that satisfies the selection criteria of the connected query predicate 460 of the join node 415, then the DBMS 150 returns to the table node 420 and scans the table for the next row and returns to the table node 425 and once again searches for a second row in the table identified by the table node 425 that satisfies the selection criteria of the query predicate 460 of the join node 415.

Once a matching row in the table identified by the table node 425 is identified that satisfies the selection criteria of the query predicate 460, the DBMS 150 returns the found first row (read in a scan operation from the table represented by the node 420) and second row (read from the table node 425) in an intermediate result set to the join node 410. The DBMS 150 then travels to the right child table node 430 and searches for a third row in the table t3 identified by the table node 430 that satisfies or meets the query predicates 455. Notice that, in determining whether or not a row in the table T3 satisfies the query predicates 455, the DBMS 150 uses the first row that was found in the table node t1 and was returned in the intermediate result set, in order to compare t1.c2=t3.c2. If the DBMS 150 does not find a row in the table t3 that satisfies the query predicates 455 for the intermediate result set returned from the join node 415, then the DBMS 150 returns to the join node 415 and re-performs the join 415, retrieving the next row from the table t1 and finding a row in the table t2 that satisfies the query predicate 460 before returning to the join node 410 and once again searching for a third row in the table t3 that meets the query predicates 455.

After the DBMS 150 has found a third row in the table t3 that satisfies the criteria of the query predicates 455, the DBMS 150 returns the intermediate result set of the first row from the table t1, the second row from the table t2, and the third row from the table t3 that meets the criteria of the query predicates 455 and 460 to the join node 405. The DBMS 150 then travels to the right child node 435 of the join node 405, encounters (reads) the table node 435 and searches for a fourth row in the table t4 identified by the table node 435 that satisfies the criteria of the query predicates 450 and 465 while using the rows in the intermediate result set to perform the comparison of the query predicates 450 and 465.

The DBMS 150 scans all rows in the table t4, and then processing of the DBMS 150 returns back to the join node 410, which ensures that all rows in the table t3 are scanned for the current rows retrieved from the tables t1 and t2. Once all rows in the table t3 are scanned and any matches are processed further by the DBMS 150 at the join node 405, the DBMS 150 returns to the join node 415, retrieves the next row from the table t1, and repeats the aforementioned sequence of operations. Thus, the table node 420 representing the table t1 235-1 is the first table in the join order of the execution plan 225-1 because the DBMS 150 scans rows from the table t1 235-1 prior to reading rows from any of the other tables (represented by the nodes 425, 430, and 435) in the join order. The table t2 235-2 represented by the node 425 is second in the join order because the DBMS 150 reads rows from the table t2 235-2 after reading rows from the table t1 in order to determine if the query predicates 460 are satisfied and prior to reading rows from the table t3 and t4, represented by the respective nodes 430 and 435. The table t3 235-3 represented by the node 430 is third in the join order because the DBMS 150 reads rows from the table t3 235-3 after reading rows from the table t1 and t2, in order to determine if the query predicates 455 are satisfied and prior to reading rows from the table t4. The table t4 235-4 represented by the node 435 is fourth, or last, in the join order because the DBMS 150 reads rows from the table t4 235-4 last after reading rows from the tables t1, t2, and t3, in order to determine if the query predicates 450 and 465 are satisfied.

A tree graph, with parent and child nodes, is merely a logical representation of a query execution, which aids in understanding how the execution engine 230 executes a particular query. But, the execution plan 225 generated by the query optimizer 215 may comprise code understandable and executable by the execution engine 230. This code does not require parent nodes and child nodes but, instead, comprises logic that is represented by a tree graph model having such nodes and connections and may be implemented as other types of data structures as well. Accordingly, while embodiments of the invention have been described herein using such tree graph terminology, actual creation and modification of a tree graph are not required.

Figures 5, 6:
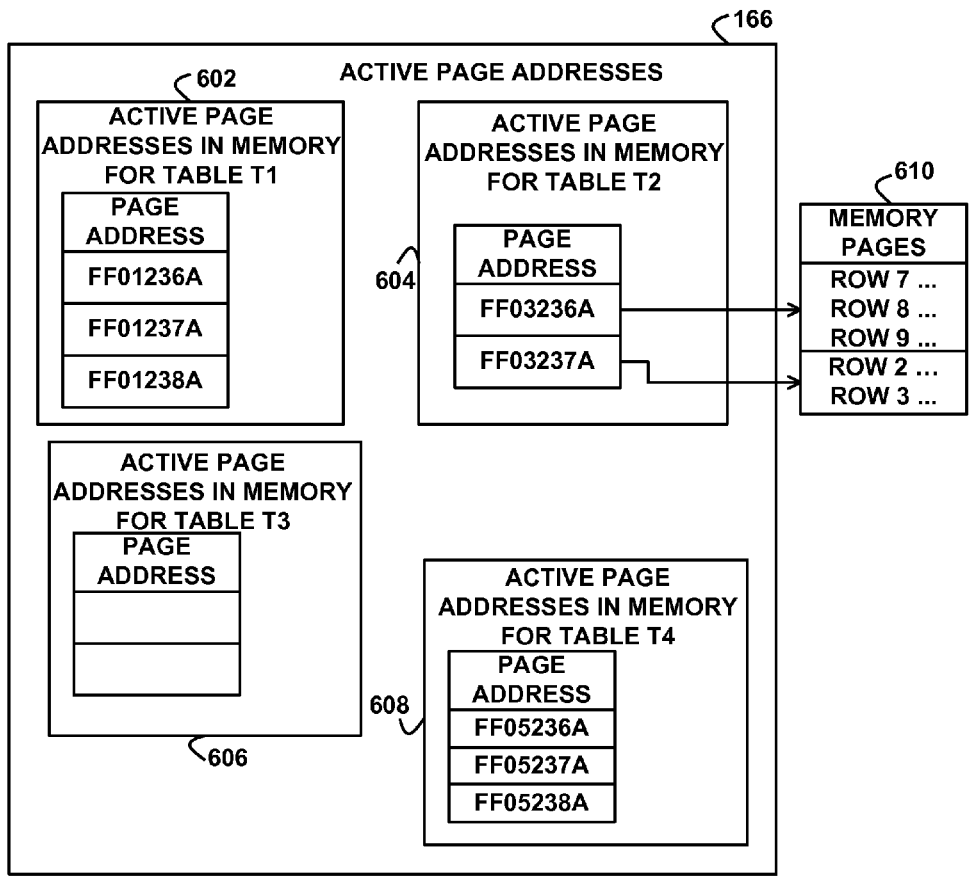
FIG. 5 depicts a block diagram of an example page residency data structure, according to an embodiment of the invention.
FIG. 6 depicts a block diagram of an example active page addresses data structure, according to an embodiment of the invention.

FIG. 5 depicts a block diagram of an example page residency data structure 164, according to an embodiment of the invention. The page residency data structure 164 comprises examples records 502, 504, 506, and 508, each of which comprises a table identifier field 530 and a percentage in memory field 535. The table identifier field 530 specifies an identifier of a table 235. The percentage in memory field 535 specifies a percentage of the data in the table identified by the table identifier field 530, in the same record, that is stored in the memory 102, as opposed to the secondary storage devices 125.

FIG. 6 depicts a block diagram of an example active page addresses data structure 166, according to an embodiment of the invention. The active page addresses data structure 166 specifies the page addresses for each of the database tables that are stored in the memory 102 (as opposed to stored in the secondary storage devices 125). For example, the active page addresses 166 comprise the active page addresses 602, which specifies the page addresses of the pages in the memory 102 that store the rows in the table T1 235-1. The active page addresses 166 further comprise the active page addresses 604, which specifies the page addresses of the pages 610 in the memory 102 that store the rows in the table T2 235-2. The active page addresses 166 further comprise the active page addresses 606, which specifies the page addresses in the memory 102 that store the rows in the table T3 235-3. The active page addresses 606 contain no addresses because, in this example, none of the rows in the table T3 are present in the memory 102. The active page addresses 166 further comprise the active page addresses 608, which specifies the page addresses in the memory 102 that store the rows in the table T4 235-4.

A page is a fixed-length block of the memory 102 that an operating system or the DBMS 150 uses as a unit of transfer between the memory 102 and the secondary storage devices 125. A page may comprise one or more locations (each having a size of one or more bytes), each identified by an address. Each page may store a portion of a row or one or more rows of a table. The page addresses in the active page addresses for each table are stored in ascending page address order. As illustrated by the memory pages 610 and the active page addresses 604, the active page addresses are in ascending page address order, which may be different from the order of the row identifiers of the rows in the table.

Figure 7:
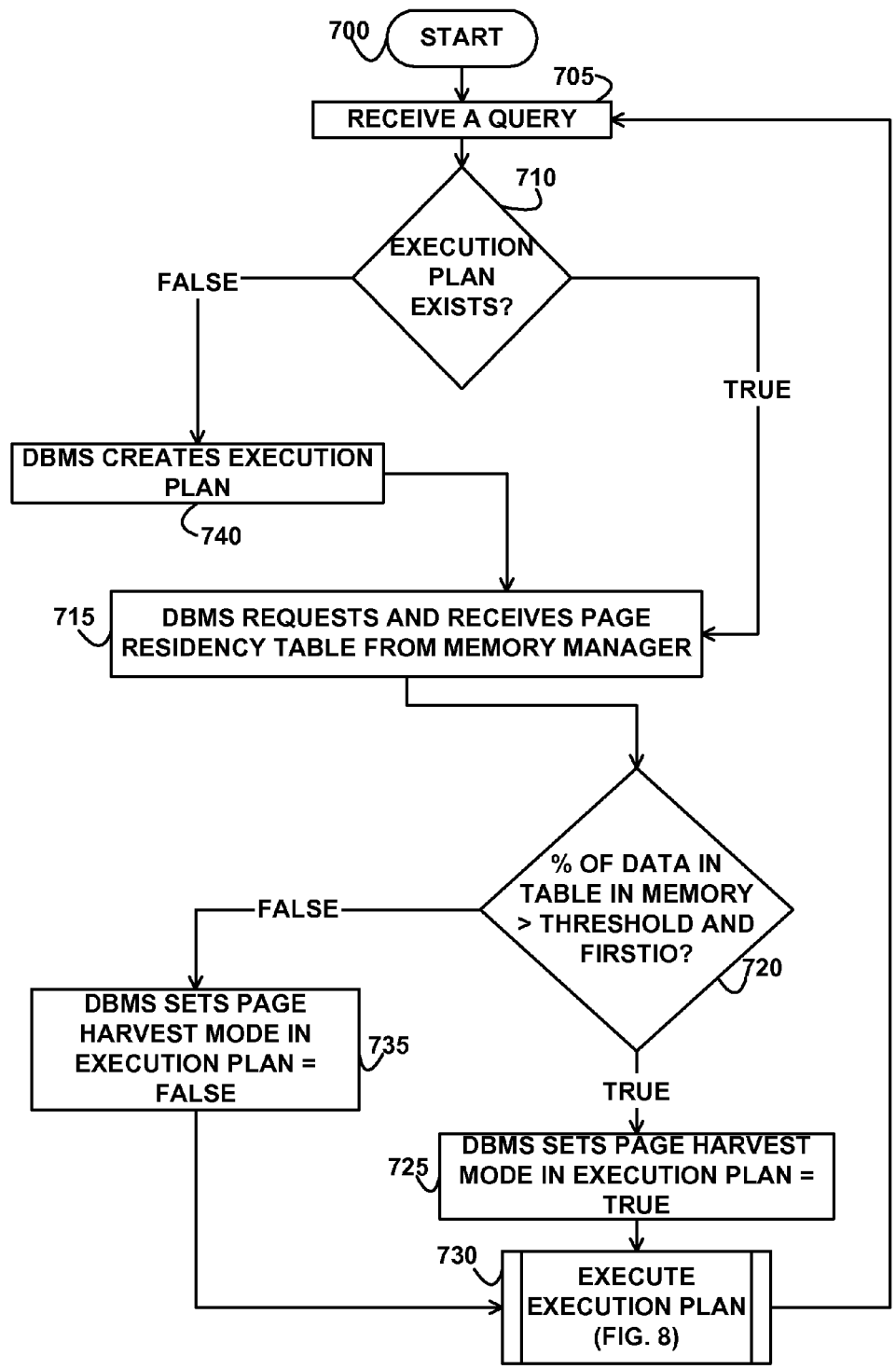
FIG. 7 depicts a flowchart of example processing for creating an execution plan, according to an embodiment of the invention.

FIG. 7 depicts a flowchart of example processing for creating an execution plan, according to an embodiment of the invention. Control begins at block 700. Control then continues to block 705 where the DBMS 150 receives a query 158 from the application 160. Control then continues to block 710 where the DBMS 150 determines whether an execution plan 225 that implements the query 158 exists. If the determination at block 710 is true, then an execution plan 225 exists that implements the query 158, so control continues to block 715 where the DBMS 150 requests and receives the page residency table 164 from the memory manager 162. Control then continues to block 720 where the DBMS 150 determines whether the percentage of the data in a table that is stored in the memory 102 is greater than a memory threshold. In an embodiment, the DBMS 150 optionally also determines whether the query 158 requests that the query 158 be executed via an execution plan that uses a FIRSTIO option or a First N records option (where "N" is a specified number of records).

In a FIRSTIO execution plan or a First N records execution plan, the query optimizer 215 does not consider the performance of retrieving all records that satisfy the query 158, but instead considers the performance of retrieving a number (N) of records that satisfy the query or a number of records that both satisfy the query 158 and that can be simultaneously displayed or viewed in one window of a display screen of the user I/O device 121. The query optimizer 215 estimates the performance (estimated execution time) for multiple execution plans and selects the FIRSTIO execution plan from the multiple execution plans that has the best estimated performance or lowest estimated time of execution for finding the number of records that both satisfy the query 158 and that can be simultaneously displayed or viewed in one window. In various embodiments, the query optimizer 215 may calculate the estimated times using such factors as the number of records in the tables, the cardinality of the keys of the query 158, the cardinality of tables with respect to each other, or any other appropriate factors.

The window is a visual area of a display screen that displays the result set 152 generated by execution of the query 158. In an embodiment, the number of records that can be simultaneously displayed or viewed is a default or predetermined number that is set by the query optimizer 215 or input by a database administrator or another program. In another embodiment, the query optimizer 215 reads, via an operating system, the number of bytes the result set window is able to receive, the number of characters the window is able to receive, the number of displayable lines in the window, and/or the font size of characters in the window. The optimizer 215 further determines the size of a displayed record from the number of bytes or characters in a record by determining the columns or fields that the query 158 requests to be displayed and by determining the column or field size from the database 220. The query optimizer 215 then adjusts the number of records that be simultaneously displayed or viewed in one window by adjusting the number of characters or bytes for readability in view of the line spacing, font size, column or field size, and top/bottom/right/left margins in the window.

In an embodiment, the FIRSTIO execution plan specifies a technique of probing records from each database table, or from the first database table in a join order, using an index to randomly access the table. In another embodiment, the FIRSTIO execution plans specifies any appropriate technique, either scanning, probing, or a combination thereof. In a probe operation, the optimizer 215 retrieves a record from a table via a random access operation using the index 240 and a key or column value into the index 240 to indirectly retrieve the indexed record from the table, without needing to scan all records in the table from beginning to end.

If the determination at block 720 is true, then the percentage of the data in a table that is stored in the memory 102 is greater than a memory threshold (and optionally the query 158 specifies a FIRSTIO or a First N records option), so control continues to block 725 where the DBMS 150 sets the page harvest mode indicator 495 in the execution plan to indicate true for the table. Control then continues to block 730 where the DBMS 150 executes the execution plan, as further described below with reference to FIG. 8. In an embodiment, a characteristic of database systems is that although the tables may be large, at any time, the data in the tables may have frequently referenced portions of the data called data hotspots. The data representing the hotspots tends to remain in the memory because of the frequency of reference, and the data not frequently referenced tends to be paged out of memory to the secondary storage devices. By reading the rows from the pages in the memory first, in an embodiment, the DBMS tends to find and present a result set comprising the data hotspots for FIRSTIO and the First N row query options.

Control then returns to block 705 where the DBMS 150 receives the same or a different query 158, as previously described above. If the determination at block 720 is false, then the percentage of the data in the table that is stored in the memory 102 is not greater than a memory threshold or optionally the query 158 does not specify a FIRSTIO or a First N records option, so control continues to block 735 where the DBMS 150 sets the page harvest mode indicator 495 for the table in the execution plan 225 to indicate false. The DBMS 150 performs the processing of blocks 720, 725, and 735 for each of the tables accessed by the execution plan 225, so that some or all of the page harvest mode indicators 495 may be the same or different for the tables. Control then continues to block 730, as previously described above.

If the determination at block 710 is false, then an execution plan that implements the query 158 does not exist, so control continues to block 740 where the DBMS 150 creates an execution plan that implements the query 158, for example, as previously described above with reference to FIG. 4. In an embodiment, the DBMS 150 creates an execution plan by dividing the query 158 into query predicates and creating join nodes and table nodes connected to the query predicates. Control then continues to block 715, as previously described above.

Figure 8:
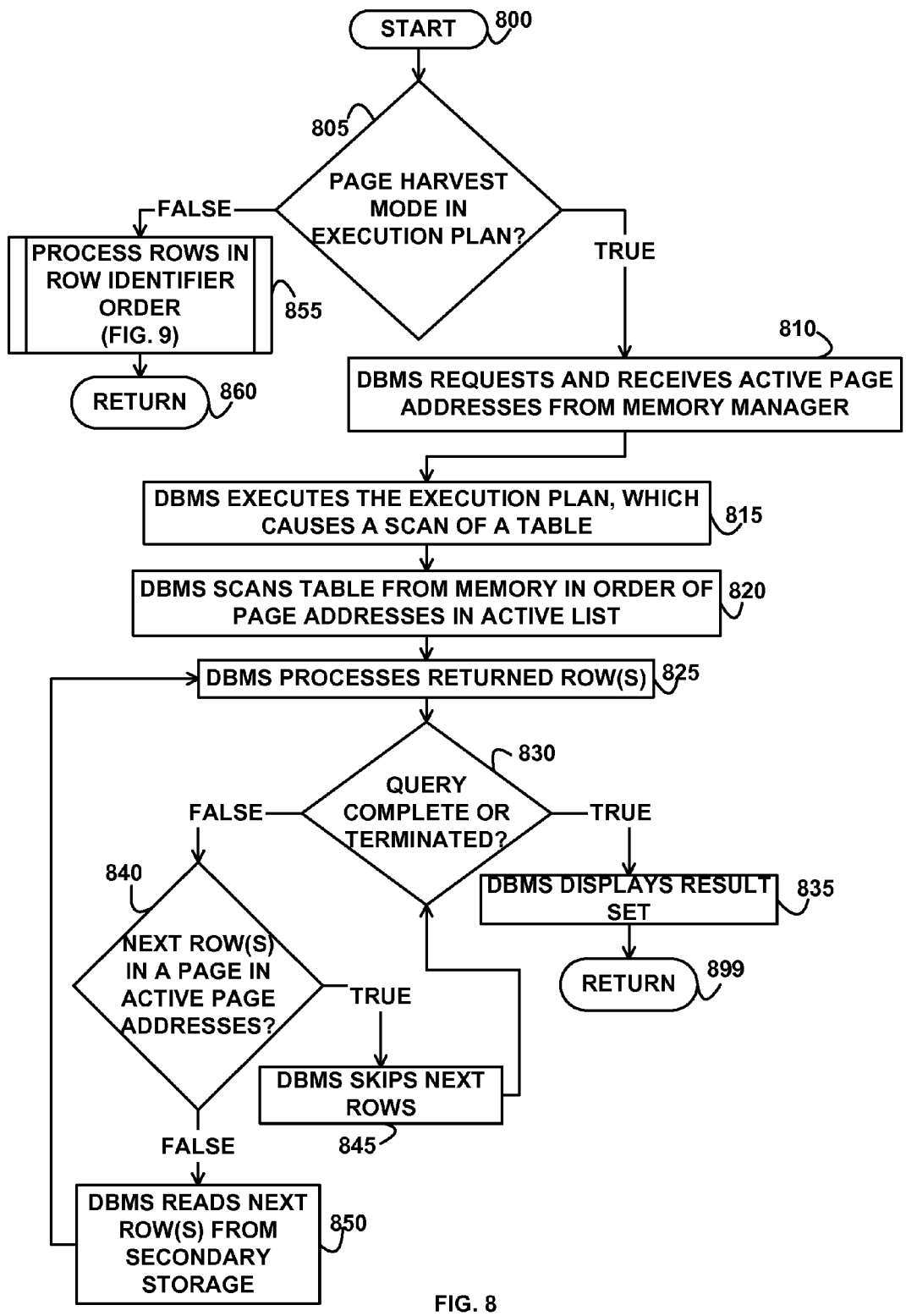
FIG. 8 depicts a flowchart of example processing for executing an execution plan, according to an embodiment of the invention.

FIG. 8 depicts a flowchart of example processing for executing an execution plan, according to an embodiment of the invention. Control begins at block 800. Control then continues to block 805 where the DBMS 150 determines whether the page harvest mode indicator 495 in the execution plan 225 indicates true. If the determination at block 805 is true, then the page harvest mode indicator 495 in the execution plan 225 indicates true and the execution plan 225 is in page harvest mode, so control continues to block 810 where the DBMS 150 requests and receives the active page addresses 166 from the memory manager 162. In another embodiment, the DBMS 150 finds the page location addresses of the rows needed by the execution plan 225 via the indexes 240, passes the page location addresses to the memory manager 162 and, in response, receives the active page addresses 166 from the memory manager 162. Control then continues to block 815 where the DBMS 150 executes the execution plan 225, which causes a scan of a table, as previously described above with reference to FIG. 4. Control then continues to block 820 where the DBMS 150 scans or reads rows from the table in the memory 102 in ascending order of the page addresses of the memory pages that comprise the rows, as specified by the active page addresses data structure 166 for the table. In an embodiment, the DBMS 150 reads all of the rows in the table that are stored in the memory 102. In another embodiment, the DBMS 150 reads a portion of the rows in the table that are stored in the memory. Control then continues to block 825 where the DBMS 150 processes the rows returned by the scan, including evaluating the query predicate(s) in the execution plan 225, storing row(s) to the result set 152 that meet or satisfy the query predicate, and/or removing rows from result set 152 that do not meet or satisfy the query predicate, as previously described above with reference to FIG. 4. In an embodiment, the DBMS 150 may perform the processing illustrated in blocks 815 and 820 multiple times for different rows, different join nodes, different query predicates, and/or for different tables, until all of the rows in the table(s) that are stored in the memory 102 are read, in order to carry out the execution of the execution plan, as previously described above with reference to FIG. 4.

Control then continues to block 830 where the DBMS 150 determines whether the execution of the execution plan 225 that implements the query 158 is complete, all rows that satisfy the query 158 have been read, or the user has requested that the execution of the execution plan be terminated. If the determination at block 830 is true, then the query 158 is complete or the user has requested that the execution be terminated, so control continues to block 835 where the DBMS 150 displays or presents the result set 152 via the user I/O device 121. Control then continues to block 899 were the logic of FIG. 8 returns to the invoker.

If the determination at block 830 is false, then the query 158 is not complete and the user has not requested that the execution of the execution plan be terminated, so control continues to block 840 where the DBMS 150 determines whether the next row(s) in the table (the next row(s) not yet read from the secondary storage devices 125) are in a page whose page address is specified in the active page addresses 166. If the determination at block 840 is true, then the next row(s) in the table are in a page whose page address is specified in the active page addresses 166 for the table, so control continues to block 845 were the DBMS 150 skips and does not read the next row(s) from the secondary storage devices 125 because the DBMS 150 has already read those rows from the memory 102. Control then returns to block 830, as previously described above.

If the determination at block 840 is false, then the next row(s) in the table are not in a page whose page address is specified in the active page addresses 166 for the table, so control continues to block 850 where the DBMS 150 reads the next row(s) from the secondary storage devices 125. Control then returns to block 825 where the DBMS 150 processes the rows that were read from the secondary storage devices 125. Control then continues to block 830, as previously described above. Thus, by operation of the loop that starts at block 825, the DBMS 150 reads (scans) and processes, in page address order, those rows that were not previously scanned from the memory 102, so the rows read from the memory 102 are different from the rows read from the secondary storage devices 125, and none of the rows read from the secondary storage devices 125 were stored in the memory 102 at the time that the DBMS read rows from the memory 102 (at block 820).

If the determination at block 805 is false, then the page harvest mode indicator 495 in the execution plan 225 indicates false and the execution plan 225 is not in page harvest mode, so control continues to block 855 that the DBMS 150 processes rows in the table in row identifier order, as further described below with reference to FIG. 9. Control then continues to block 860 where the logic of FIG. 8 returns to the invoker.

Thus, the DBMS 150 scans rows in pages that are in the memory 102 prior to scanning rows from the secondary storage devices 125, which, in an embodiment, may improve performance since the memory 102 may have a faster access time than do the secondary storage devices 125.

Figure 9:
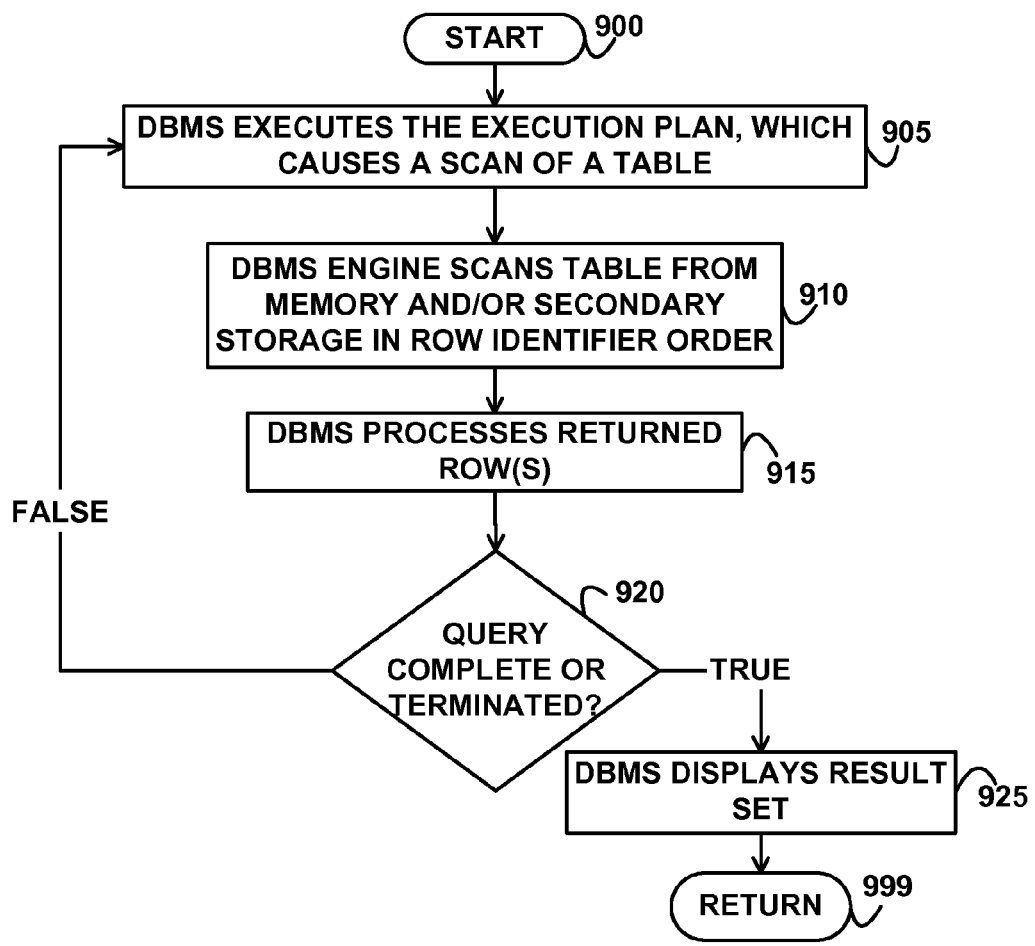
FIG. 9 depicts a flowchart of example processing for scanning a table in row identifier order, according to an embodiment of the invention.

FIG. 9 depicts a flowchart of example processing for scanning a table in row identifier order, according to an embodiment of the invention. Control begins at block 900. Control then continues to block 905 where the DBMS 150 executes the execution plan 225, which causes a scan of a table, as previously described above with reference to FIG. 4. Control then continues to block 910 where the DBMS 150 scans or reads rows from the table in the memory 102 and/or the secondary storage devices 125 in ascending order of the identifiers of the rows. Control then continues to block 915 where the DBMS 150 processes the rows returned by the scan, including evaluating the query predicate, storing row(s) to the result set 152 that satisfy the query predicate, and/or removing rows from result set 152 that do not satisfy the query predicate, as previously described above with reference to FIG. 4.

Control then continues to block 920 where the DBMS 150 determines whether the execution of the execution plan for the query 158 is complete, all rows that satisfy the query 158 have been read, or the user has requested that the execution of the execution plan be terminated. If the determination at block 920 is true, then the query 158 is complete or the user has requested that the execution be terminated, so control continues to block 925 where the DBMS 150 displays or presents the result set 152 via the user I/O device 121. Control then continues to block 999 were the logic of FIG. 9 returns to the invoker.

If the determination at block 920 is false, then the query 158 is not complete and the user has not requested that the execution of the execution plan be terminated, so control returns to block 905 where the DBMS 150 continues executing the execution plan, which causes a scan of the same or a different table. Control then continues to block 910, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
reading, from memory, a first plurality of rows of a first table in an order of page addresses of pages in the memory that comprise the first plurality of rows as is specified by an active page address data structure for the first table, wherein none of a second plurality of rows were stored in the memory at a time of the reading of the first plurality of rows;
storing first selected rows from the first plurality of rows that meet a query predicate into a result set;
after the reading the first plurality of rows from the memory, reading, from a secondary storage, the second plurality of rows of the first table in an ascending order of row identifiers of the second plurality of the rows from the beginning to the end of the first table, wherein the first plurality of rows are different from the second plurality of rows;
storing second selected rows from the second plurality of rows that meet the query predicate into the result set;
performing the reading, from the memory, the first plurality of rows of the first table in the order of the page addresses and the reading, from the secondary storage, the second plurality of rows of the first table in the ascending order of row identifiers after the reading of the first plurality of rows when a percentage of data in the first table that is stored in the memory is greater than a memory threshold; and
reading the first plurality of rows and the second plurality of rows in an ascending order of row identifiers of the first plurality or rows and the second plurality of rows when the percentage of the data in the first table that is stored in the memory is not greater than a memory threshold.

2. The method of claim 1, wherein the secondary storage has a slower access time than the memory.

3. The method of claim 1, wherein an execution plan that implements a query specifies the query predicate, the first table, and a page harvest mode indicator.

4. The method of claim 3, further comprising:
setting the page harvest mode indicator in the execution plan to indicate true when the percentage of the data in the first table that is stored in the memory is greater than the memory threshold.

5. The method of claim 4, further comprising:
setting the page harvest mode indicator in the execution plan to indicate false when the percentage of the data in the first table that is stored in the memory is not greater than the memory threshold.

6. A computer-readable storage medium encoded with instructions, wherein the instructions when executed comprise:
reading, from memory, a first plurality of rows of a first table in an order of page addresses of pages in the memory that comprise the first plurality of rows as is specified by an active page address data structure for the first table, wherein none of a second plurality of rows were stored in the memory at a time of the reading of the first plurality of rows;
storing first selected rows from the first plurality of rows that meet a query predicate into a result set;
after the reading the first plurality of rows in the order of the page addresses, reading, from a secondary storage, the second plurality of rows of the first table in an ascending order of row identifiers of the second plurality of the rows from the beginning to the end of the first table, wherein the first plurality of rows are different from the second plurality of rows;
storing second selected rows from the second plurality of rows that meet the query predicate into the result set;
performing the reading, from the memory, the first plurality of rows of the first table in the order of the page addresses and the reading, from the secondary storage, the second plurality of rows of the first table in the ascending order of row identifiers after the reading of the first plurality of rows when a percentage of data in the first table that is stored in the memory is greater than a memory threshold; and
reading the first plurality of rows and the second plurality of rows in an ascending order of row identifiers of the first plurality or rows and the second plurality of rows when the percentage of the data in the first table that is stored in the memory is not greater than a memory threshold.

7. The computer-readable storage medium of claim 6, wherein the secondary storage has a slower access time than the memory.

8. The computer-readable storage medium of claim 6, wherein an execution plan that implements a query specifies the query predicate, the first table, and a page harvest mode indicator.

9. The computer-readable storage medium of claim 8, further comprising:
setting the page harvest mode indicator in the execution plan to indicate true when the percentage of the data in the first table that is stored in the memory is greater than the memory threshold.

10. The computer-readable storage medium of claim 9, further comprising:
setting the page harvest mode indicator in the execution plan to indicate false when the percentage of the data in the first table that is stored in the memory is not greater than the memory threshold.

11. A computer system, comprising:
a processor; and
memory communicatively coupled to the processor, wherein the memory is encoded with instructions, wherein the instructions when executed on the processor comprise:
reading, from memory, a first plurality of rows of a first table in an order of page addresses of pages in the memory that comprise the first plurality of rows as is specified by an active page address data structure for the first table,
storing first selected rows from the first plurality of rows that meet a query predicate into a result set,
after the reading the first plurality of rows in the order of the page addresses, reading, from a secondary storage, the second plurality of rows of the first table in an ascending order of row identifiers of the second plurality of the rows from the beginning to the end of the first table, wherein the first plurality of rows are different from the second plurality of rows, wherein none of the second plurality of rows were stored in the memory at a time of the reading of the first plurality of rows, storing second selected rows from the second plurality of rows that meet the query predicate into the result set, performing the reading, from the memory, the first plurality of rows of the first table in the order of the page addresses and the reading, from the secondary storage, the second plurality of rows of the first table in the ascending order of row identifiers after the reading of the first plurality of rows when a percentage of data in the first table that is stored in the memory is greater than a memory threshold, and reading the first plurality of rows and the second plurality of rows in an ascending order of row identifiers of the first plurality or rows and the second plurality of rows when the percentage of the data in the first table that is stored in the memory is not greater than a memory threshold.

12. The computer system of claim 11, wherein the secondary storage has a slower access time than the memory.

13. The computer system of claim 11, wherein an execution plan that implements a query specifies the query predicate, the first table, and a page harvest mode indicator.

14. The computer system of claim 13, wherein the instructions further comprise:
   setting the page harvest mode indicator in the execution plan to indicate true when the percentage of the data in the first table that is stored in the memory is greater than the memory threshold.

15. The computer system of claim 14, wherein the instructions further comprise:
   setting the page harvest mode indicator in the execution plan to indicate false when the percentage of the data in the first table that is stored in the memory is not greater than the memory threshold.

* * * * *